Aug. 11, 1959 W. J. HOFBAUER 2,898,787
ROTARY CUTTING TOOL
Filed March 4, 1957 2 Sheets-Sheet 1

INVENTOR.
WILLIAM HOFBAUER
BY
ATTORNEY

Aug. 11, 1959 W. J. HOFBAUER 2,898,787
ROTARY CUTTING TOOL
Filed March 4, 1957 2 Sheets-Sheet 2
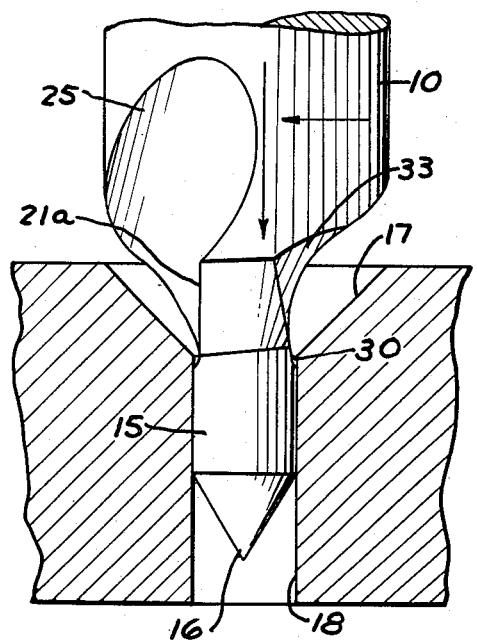
Fig. 4
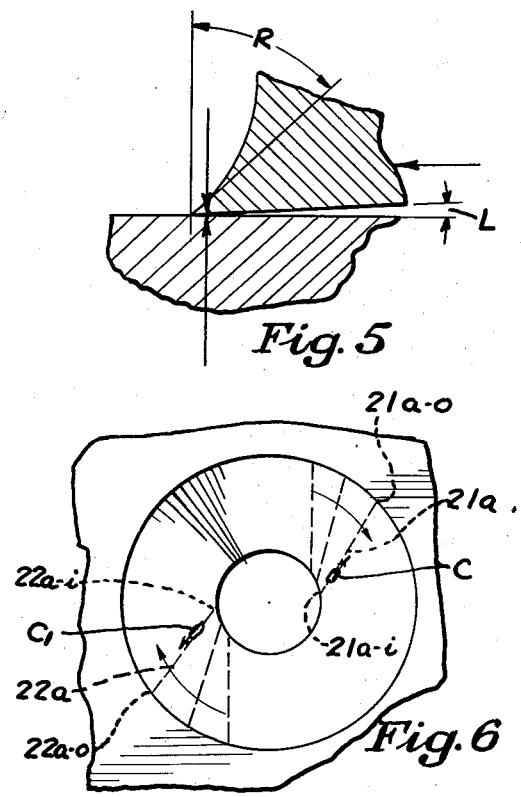
Fig. 5
Fig. 6
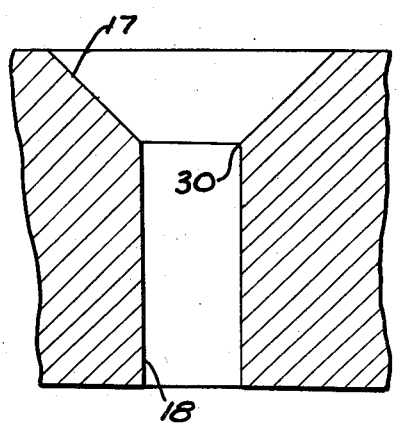
Fig. 7
Fig. 8
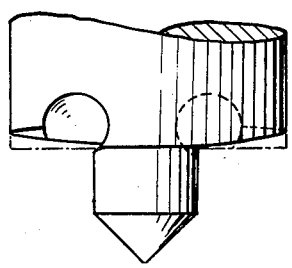
INVENTOR.
WILLIAM HOFBAUER
BY
ATTORNEY

2,898,787

ROTARY CUTTING TOOL

William J. Hofbauer, Montpelier, Ohio

Application March 4, 1957, Serial No. 643,633

4 Claims. (Cl. 77—73.5)

This invention relates to rotary cutting tools and more particularly to an improved tool for countersinking or counterboring holes such as for receiving rivet heads or screw and bolt heads.

It is well known in the art that countersinking holes is one of the most difficult operations which not only slows down production but, in some cases, causes spoilage of work pieces. Use of conventional countersink tools usually causes chatter, particularly at the beginning of the countersink operation. Often the tool steadies itself toward the end of the countersink operation, but, in many cases, chattering continues to increase, producing a hole with rough and ridged chamfer. It has been found that the above difficulty occurs not only when the workpiece is made of hard metal such as steel or brass, but even when the workpiece is made of relatively soft metal such as aluminum, soft brass, copper, and the like.

Particular difficulties of this nature are encountered in manufacturing aircraft where producing rivet-receiving holes constitutes a large portion of manufacturing operations. In many instances of aircraft production, even a light chatter of countersink tools may be very objectionable. Because of a great multiplicity of countersink operations, rapid production of countersink holes has been one of the major problems in manufacturing aircraft. On the other hand, it has been found that one of the ways to eliminate chatter is to slow down the countersink tool to a very low speed. This not only slows down manufacturing but often requires resetting machines and exercising extreme care in engaging the work by the countersink tool.

The second problem confronted in producing countersink holes, particularly in aluminum workpieces, has been clogging of the teeth of chamfering tools and galling of the countersink surface. In fact, this particular problem became even more important than chattering in industries such as aircraft manufacturing, and great efforts of those skilled in the art have been directed for a number of years toward finding some solution for this problem. With aluminum and other relatively soft metals, clogging of the tool teeth with the soft metal occurs very fast, manifesting itself in tight packing of the recesses between the teeth with metal chip, whereupon the tool begins to score the surface of the countersink recess, requiring withdrawal of the tool from the work and cleaning of its teeth. Such cleaning is often very difficult and may even require removal of the tool from the machine. As a result, production of countersunk holes has not only been a slow and tedious operation, but often could not be performed properly without the metal at such holes being scored and torn, causing origination of a large number of minute cracks having a tendency of growing or penetrating further into the body of the metal and endangering the strength of the aircraft, often in the most critical places.

One of the objects of the present invention is to provide an improved rotary cutting tool whereby the above difficulties and disadvantages are overcome and in many cases virtually eliminated without introducing new problems or increasing the costs involved.

Another object of the present invention is to provide an improved countersink or similar tool which operates smoothly and without chattering from the very moment it engages the workpiece until its withdrawal therefrom.

A further object of the present invention is to produce an improved countersink tool for use mainly on relatively soft non-ferrous metals, particularly aluminum, in which there are provided improved means for both producing the chip and for disposal thereof in a manner as to keep the chamfered hole and the tool completely clean of chip and to eliminate interference of the chip with the chamfering operation.

A further object of the present invention is to provide an improved countersink tool which chamfers holes exactly to the predetermined dimensional specification and produces smooth finish without any scores, burrs or galls on the surface of the chamfer or any raised ridge at the peripheral edge thereof.

A still further object of the present invention is to provide an ipmroved countersink tool, particularly for use on aluminum and similar metals, which can be used at a very high speed for the purposes of quantity production, and which requires little care in engaging the work and, therefore, enables successful use of non-skilled labor for operating machines using such tools.

A still further object of the present invention is to produce an improved countersink tool with the aid of which holes are countersunk smoothly and cleanly and with extreme rapidity.

A further object of the present invention is to provide an improved countersink tool, particularly for use on aluminum, which countersinks holes smoothly and precisely to the required dimensional specifications without originating minute cracks in the countersunk surface, thereby eliminating the danger of such cracks growing or penetrating further into the body of the metal.

A still further object of the present invention is to provide an improved countersink tool having means burnishing the hole and particularly the place of juncture of the cylindrical hole with the conical surface, thus ensuring easy entry of the river without interference from a burr or ridge produced at such place by conventional chamfering tools.

Further objects and advantages of this invention will be apparent from the following description and appended claims, reference being had to the accompanying drawings forming a part of this specification, wherein like reference characters designate corresponding parts in the several views.

Fig. 4 is a view partly in section illustrating my imcountersinking operation.

Fig. 5 is a sectional view taken in the direction of proved tool in the countersunk hole at the end of the the arrows on the section plane passing through the line 5—5 of Fig. 1.

Fig. 6 is a plan view of a chamfered hole with the edges of the tool disposed thereat at the end of the chamfering operation being indicated in dotted lines in several successive positions.

Fig. 7 is a sectional view illustrating a finished chamfered hole, the section having been taken along the axis of the hole.

Fig. 8 is an elevational view of a tool of a modified construction and embodying the present invention.

Figure 1:
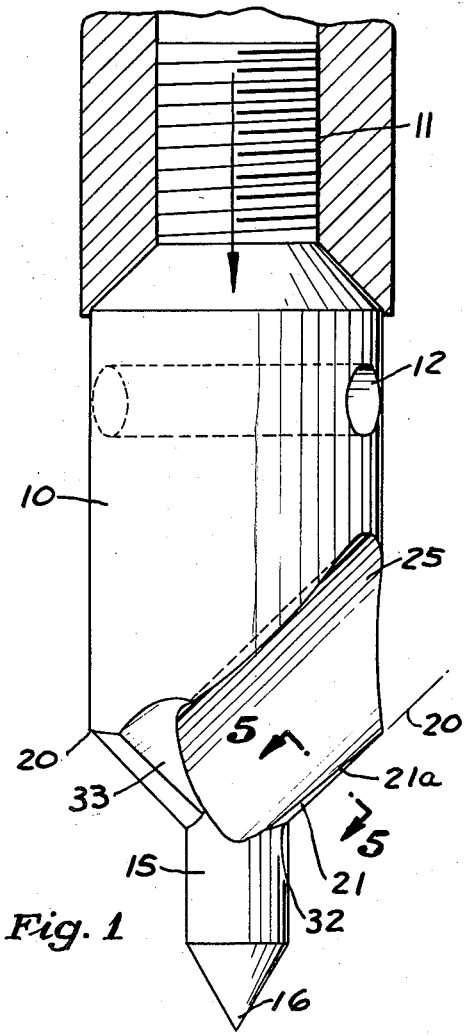
Fig. 1 is an elevational view of one tool embodying the present invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not of limitation.

In accordance with the invention I provide a countersink tool for use on soft metals, particularly aluminum, which tool is adapted to produce under light feeding pressure a fine chip resembling that produced by scraping. The tool is so constructed that it resists its penetration into the metal beyond what is necessary to produce such fine chip. Furthermore, the tool includes novel means for disposal of the chip. Such means operate partly by centrifugal action tending to throw the produced chip outwardly, and partly by disposition of the cutting edges substantially tangentially to the chamfered hole and, therefore, causing such edge to produce a component acting on the chip outwardly along the cutting edge and forcing the chip in the outward direction, thus aiding operation of centrifugal force. My improved tool is also constructed in such a manner that the cylindrical pilot thereof has a portion of its cylindrical surface extending upwardly above the root or inner extremity of the cutting edge and immediately behind the same and, therefore, follows such edge in operation of the tool and burnishes the upper end of the hole, eliminating the burr produced by the cutting edge and projecting inwardly of the cylindrical hole. Moreover, the cutting edge has a slanted direction of cutting as explained in detail below.

In the drawings there are shown, by way of example, two rotary cutting tools embodying the present invention. Figs. 1–6 illustrate a countersink tool, while Fig. 8 illustrates what is termed in the art a "counterboring" tool.

Referring specifically to Figs. 1–6, the countersink tool illustrated therein is particularly adapted for countersinking rivet holes. The drawings illustrate a tool on an enlarged scale for the sake of clarity. The tool illustrated in Figs. 1–6 is adapted to countersink a cylindrical hole to produce an included angle of .100°, as shown in Fig. 7. It will be understood, however, that a tool adapted to countersink holes at any desired angle may be constructed in accordance with the invention, and that illustrating a tool countersinking the hole to produce the above specified angle is done by way of one specific example.

The tool of Figs. 1–6 comprises generally a cylindrical body 10 having its upper end adapted to be secured to a rotating spindle such as that of a drill press. The tool illustrated in the drawings is provided with a short threaded boss or shank 11 adapted to enter a threaded bore in the spindle. A hole 12 is provided in the body 10 of the tool for ease of turning the tool in connecting and disconnecting it to a spindle. It will be understood, however, that any other suitable connection of the upper end of the tool to a spindle may also be employed.

It will also be understood that the reference in this specification to the upper end or the lower end of the tool is made with reference to the illustration of the tool in the drawings. The tool is not limited in operation to the position illustrated in the drawings. In fact, the tool may be turned upside down, when its lower or working end will become the upper end.

The lower end of the tool is reduced in diameter to provide a cylindrical pilot 15 of the diameter corresponding to the diameter of the hole to be countersunk. This diameter is so selected that the pilot runs in the hole without wobbling and yet without excessive friction.

The end of the pilot is pointed as shown at 16 to facilitate entry of the pilot into the hole. The body portion 10 and the pilot 15 have a cone surface 20 provided between them. However, it will be understood that in a completed tool only the cutting edges of its lips 21 and 22 lie in the plane of said conical surface 20. The tool is ground off in its conical portion for the purposes explained in detail above in such a manner as to make such conical surface, with the exception of said cutting edges, merely theoretical.

Two cylindrical recesses 25 and 26 extending transversely of the tool body 10 are provided therein in a manner to have their intersections with the conical plane 20 form two cutting edges 21a and 22a. Said cutting edges are formed at the lines of intersection of the cylindrical surfaces of said recesses 25 and 26 with the cone surface 20 and, therefore, lie in said cone surface.

Figure 3:
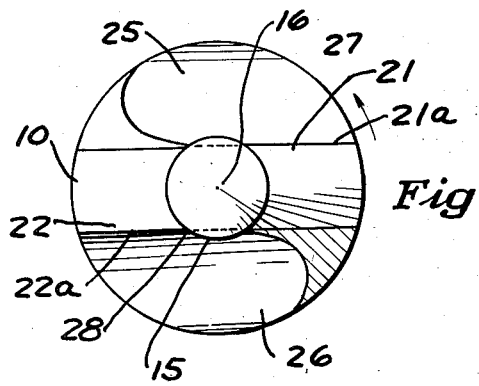
Fig. 3 is an end view of the tool of Figs. 1 and 2, looking at the point thereof.

It is of importance that the edges 21a and 22a extend in such a manner that they appear in the plan view, see Fig. 3, substantially as tangents to the circle representing the cylindrical surface of the pilot 15, but slightly offset from the position of true tangency to intersect said circle as shown at 27 and 28.

It will now be seen in view of the foregoing that the inclination of the cylindrical surface of said recesses at the cutting edges determines the rake angle of the cutting lips 21 and 22, as is best shown in Fig. 5. It should be understood that in my improved tool this angle varies somewhat with different materials. For aluminum I prefer to have this rake angle designated in the drawing by the letter R, be equal approximately 50°.

In accordance with the invention the lip clearance or lip relief angle, designated in Fig. 5 by the letter L, is very small. This relief is radial and, therefore, the angle L is a mean angle. For aluminum I prefer to have this angle to be within the range between 2° and 3°. If attempts are made to use conventional lip clearance angles in my improved tool, the tool may become unbalanced and in some cases completely inoperative. For instance, should the lip clearance be increased to say 10°, a relatively slight feeding force exerted on the tool in the direction of the work would cause the tool to seize the work and actually screw itself in into the material thereof until stopped by the heavy chip filling recesses 25 and 26. Should the stock in which the hole is provided be relatively thin, and particularly thinner than the diameter of the recesses 25 and 26, the tool with such increased lip relief angle will go through the work like a drill forming therein a hole having diameter equal to that of the tool body 10. On the other hand, should the work be of considerable thickness, the tool would dig itself in but further penetration thereof would stop when the recesses become packed with the chip.

It will thus be understood that while the rake angle R in my improved countersink tool is such that with the use of conventional lip clearance angles it would cause the tool to dig in, the extremely small lip clearance angle operates to resist the tendency of the tool to dig in. Thus, in actual operation the tool operates while being in a sort of balance or near-balance between the feeding force tending to force the tool into the work, and the resisting force opposing such feeding force. The feeding force is composed of the feeding pressure exerted on the tool by the spindle and digging-in force produced by the pressure of the chip on the cutting lips of the tool. If heavy feeding force is exerted on the tool, the heavy chip may pull the tool deeper into the work, whereupon the chip instead of being a light chip becomes a heavy solid chip causing the tool to seize the work and screw itself in. Since the feed-resisting force is determined by the magnitude of the lip relief angle L, it can be appreciated that as this angle is increased, the feed-resisting force decreases. With the angles of preferred values indicated above, the chip produced by the tool is relatively thin and is crimped. Such chip has a dull rather than a shiny appearance. Of course, when the tool screws into the work, the chip is thick and shiny.

In order to ensure particularly advantageous operation of my tool and prevent its "screwing into the work," a light and uniform feeding force is desired. Such force is produced most conveniently with the aid of suitable pneumatic means, i.e. means operated by compressed air. Enabling use of such means is an additional advantage of my improved tool, since in addition to producing smooth and dependable operation of my tool, such means enable speeder production.

In the operation of my improved tool, the thin and light chip rises from the cutting edge and is pushed outwardly, partly by the operation of centrifugal force and partly by the force component acting along the cutting edge and produced because of the tangential disposition of the cutting edge. The latter condition resembles to a certain extent the operation of a centrifugal pump in which the vanes are disposed in a manner to have in rotation their inner ends ahead of the outer ends.

This particular condition may be best understood with reference to Fig. 6 which shows the countersink hole in plan view with the three successive positions of the cutting edges of the tool indicated thereon in dotted lines. With the movement of said edges being in the direction indicated by arrows, it can be understood that the inner extremities 21a–i and 22a–i move ahead of the outer extremities 21a–o and 22a–o of said edges. Because of such a condition a solid body on particle C or C1 will tend to move along the cutting edge and, therefore, in the outward direction even without operation of centrifugal force but merely by the component of the force produced by rotation of the edge with said component acting along the edge. Thus, my improved tool, in effect, "pumps" the chip out. The cutting edge of my improved tool is thus maintained sharp and clean, and the chip does not have a chance to gall the surface of the conical recess.

It should also be appreciated that because of such arrangement of the cutting edge, the pressure which the cutting edge exerts on the work is not normal but is at an angle to the work, and in this respect the cutting edge operates similarly to helical edges on side milling cutters, giving a much smoother cut, preserving cutting ability of the edge much longer, and eliminating the possibility of chatter.

Figure 2:
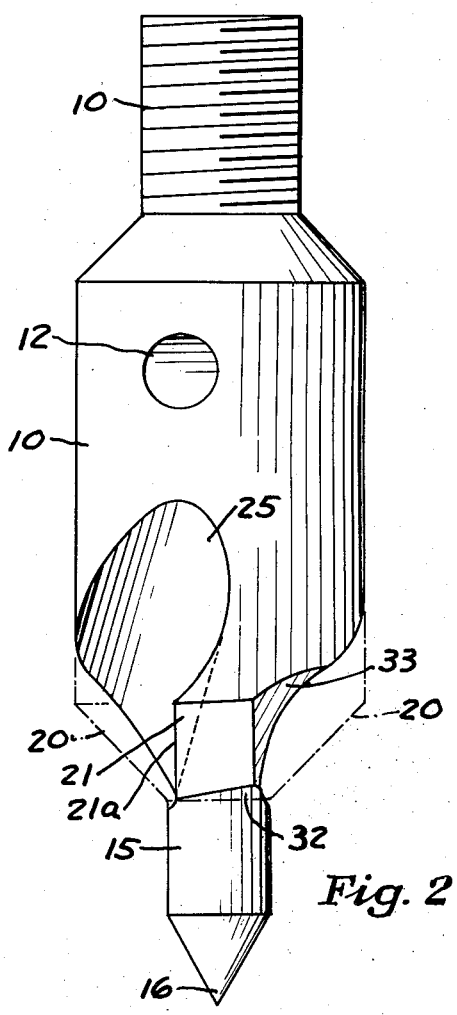
Fig. 2 is another elevational view of the same tool which is rotated around its axis through approximately 90° angle to assume the position shown.

Because of such arrangement of the cutting edge, the tendency of the cutting edge to produce a burr such as designated in Fig. 7 by the numeral 30 is virtually eliminated. Nevertheless, means are provided whereby such burr, if found at the place of juncture of the conical recess 17 and the cylindrical hole 18 by the action of the cutting edges, is burnished immediately after its formation by the cylindrical portion 32 of the pilot 15 immediately following such edge and extending above such place of juncture. With reference to Figs. 1 and 2, it will be understood that said portion 32 is formed because of the lip relief provided on the cutting lip enabling extension of the cylindrical surface of the pilot 15 for a distance above the cutting edges 21 and 22 for a distance determined by the lip relief as well as by grinding off the heels of the cutting lips as indicated at 33. By virtue of such an expedient the countersink hole is, in effect, burnished and no interference from the burr extending inwardly of the cylindrical hole occurs with the use of my improved countersink tool.

It is commonly appreciated that with the use of conventional tools, particularly on soft metals such as aluminum, such interference is so serious that in many cases it becomes necessary to ream or burnish the hole in an added operation by application of a separate tool in order to permit free entry of the river. This particular advantage of my improved tool is of great importance in riveting aluminum parts, which operation constitutes an important part of aircraft manufacturing. This feature enables use of greater automation in riveting aircraft parts or components, decreasing the cost of production and the skill required.

Fig. 8 illustrates a tool embodying the present invention but adapted to counterbore holes to have flat shoulders, or bottom. In other words, this tool may be regarded as a countersink tool with the included angle of the countersink being equal to 180°. Such tools are termed in the art "counterbores," and have wide application in industry. They may now be constructed to embody the present invention and to have a number of advantages similar to those described with respect to my improved tool illustrated in Figs. 1–6.

There is thus provided an improved rotary cutting tool of the nature disclosed above whereby the objects of the present invention listed above and numerous additional advantages are attained.

I claim:

1. A countersink tool for non-ferrous metals comprising a cylindrical body adapted to be rotated around its axis, a solid cylindrical pilot provided on the end of said body, a cone-shaped portion connecting said pilot and said body, a plurality of part-cylindrical recesses provided in said portion to form a corresponding plurality of cutting edges thereon extending within the conical surface and substantially tangent to the cylindrical surface of the pilot, the lip relief angle being equal to approximately 2 degrees, and the rake angle at said cutting edges formed by said cylindrical recess being approximately 50°.

2. In a one-piece countersink tool for non-ferrous metals, a cylindrical pilot having unbroken cylindrical surface, and at least one countersink lip having a predetermined relief and extending from said pilot to the periphery of the tool and substantially tangential to the cylindrical surface of said pilot on the leading side thereof with respect to the direction of rotation of the tool and terminating adjacently said surface but inwardly thereof, the cutting edge of said lip being formed by intersection of the relief surface and a through cylindrical recess extending at an acute angle to the pilot, with said angle being substantially equal to the angle of the countersink.

3. In a countersink tool for aluminum, a solid cylindrical pilot having diameter corresponding to the diameter of the hole to be chamfered, a plurality of cutting lips extending from the pilot to the periphery of the tool, said lips having positive rake angle of approximately 50° and lip relief angle of approximately 2°.

4. A countersink tool for non-ferrous metals, said tool comprising a cylindrical body adapted to be rotated around its axis, a solid cylindrical pilot provided on the end of said body, a cone shaped portion connecting said pilot and said body, a plurality of through part-cylindrical recesses provided on said cone shaped portion to form a corresponding plurality of cutting edges thereon extending within the conical surface and substantially tangent to the cylindrical surface of the pilot on the leading side thereof with respect to the direction of rotation of the tool.

References Cited in the file of this patent

UNITED STATES PATENTS

| 45,133 | Bonwill | Nov. 22, 1864 |
| 370,484 | Latham | Sept. 27, 1887 |

FOREIGN PATENTS

| 25,372 | Great Britain | 1911 |
| 639,490 | Great Britain | June 28, 1950 |